Oct. 3, 1939.  C. RASMUSSEN  2,174,837

SAW MACHINE

Original Filed May 9, 1936   3 Sheets-Sheet 3

Inventor:
Charles Rasmussen
By John E. Gardner
Atty.

Patented Oct. 3, 1939

2,174,837

UNITED STATES PATENT OFFICE 2,174,837

SAW MACHINE

Charles Rasmussen, Racine, Wis., assignor of one-half to John Oster, Racine, Wis.

Original application May 9, 1936, Serial No. 78,841. Divided and this application March 26, 1937, Serial No. 133,142

11 Claims. (Cl. 29—73)

The present invention relates in general to saw machines.

One of the objects of the present invention is to provide a novel mounting for a power saw so that the stock fed therein may be cut at any angle.

Another object is to provide an annular adjustable mounting for the saw without in any way disturbing the power drive connections of the machine.

A further object is to provide improved control mechanism so as to prevent the saw being operated except at the proper time.

There are other objects of my invention, which together with the foregoing will be described in the accompanying drawings.

This application is a division of my co-pending application Serial Number 78,841 filed May 9, 1936, to which reference is made for a complete description of the entire machine and its operating and control mechanism.

In the accompanying drawings, Fig. 1 is a fragmentary sectional elevation of the saw frame.

Fig. 4 is a fragmentary elevation of a slightly different form of locking mechanism for the saw frame.

Fig. 5 is an elevation of a detail thereof, and

Figure 1:
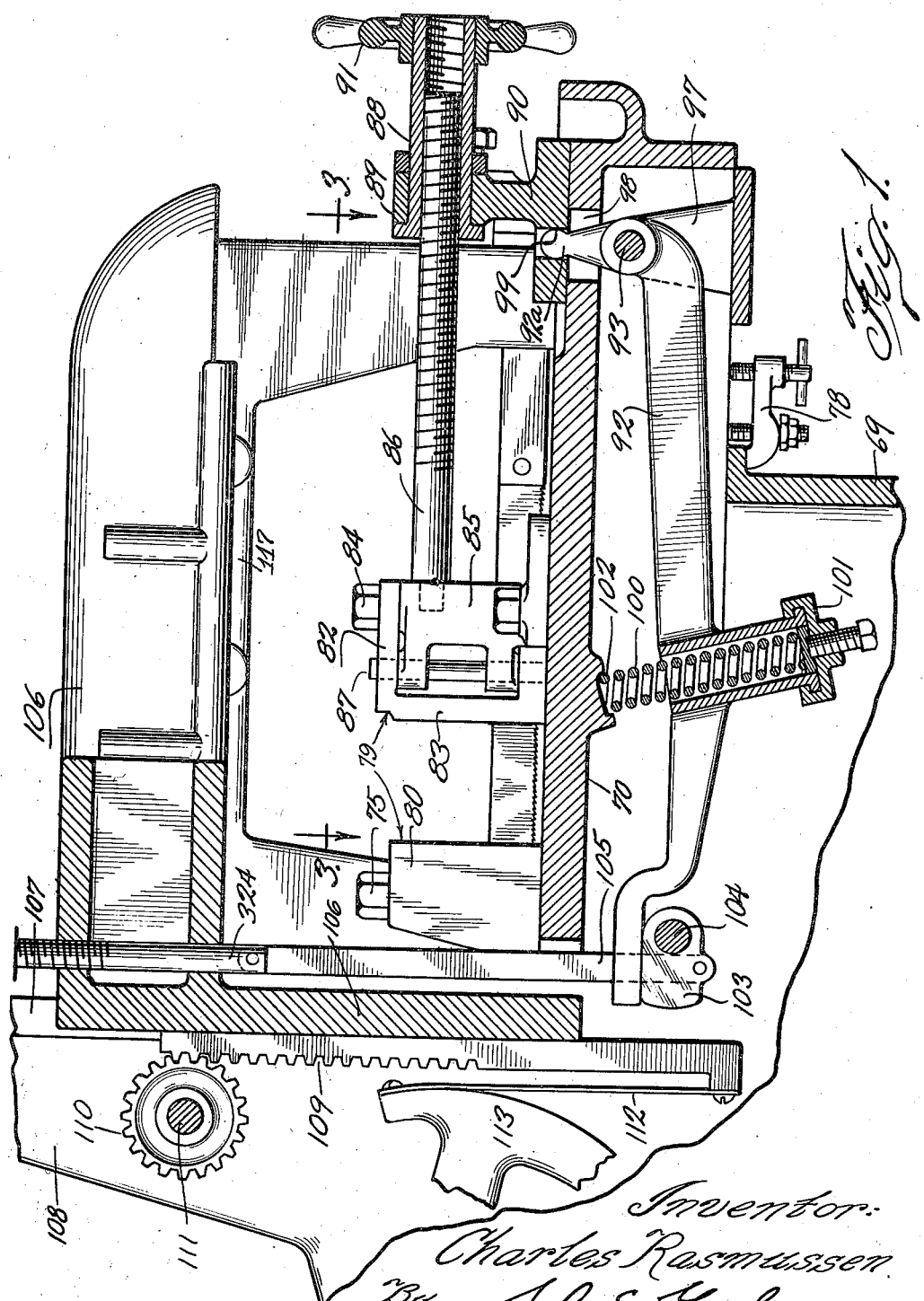
Figure 2:
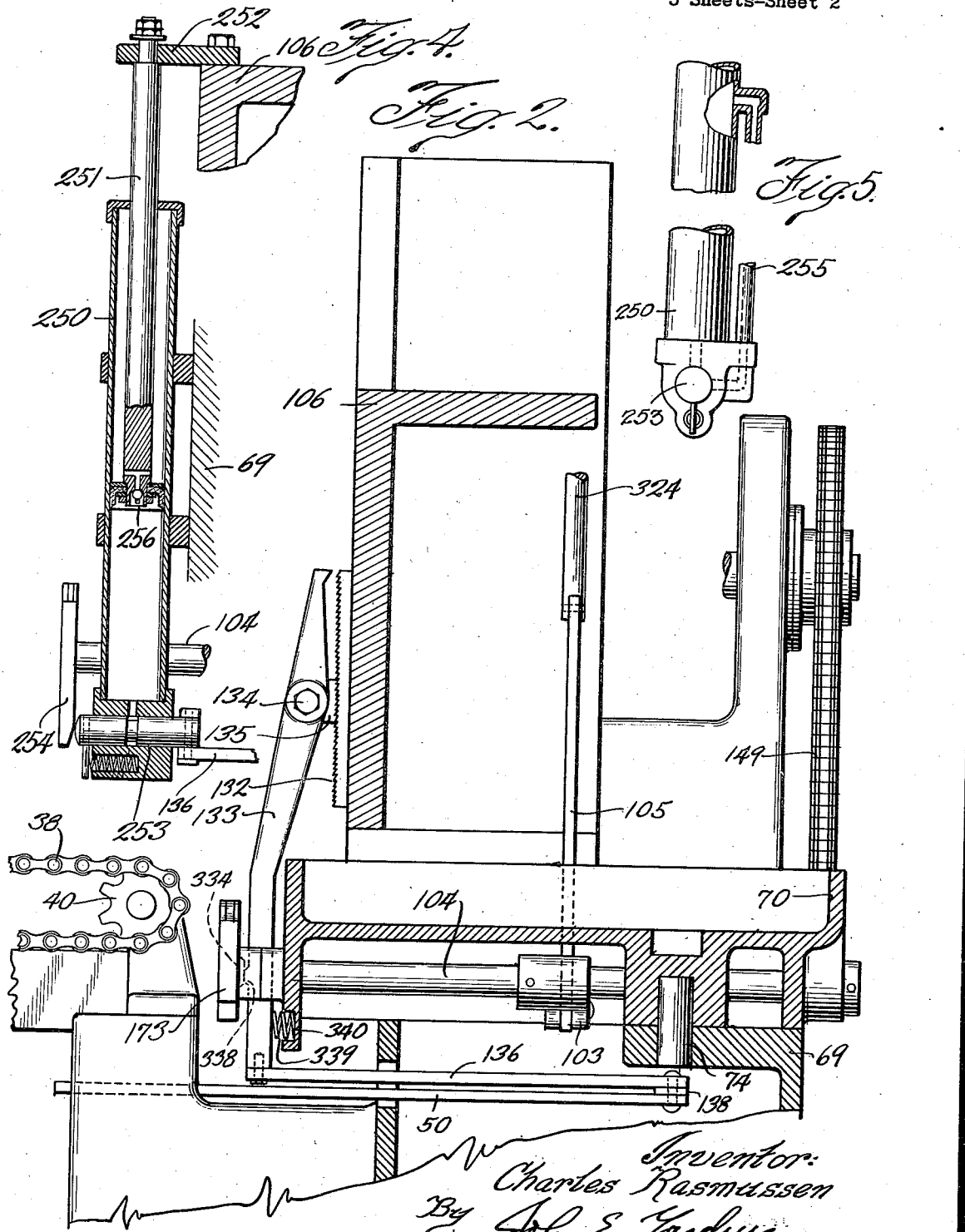
Fig. 2 is a fragmentary cross section of the saw frame.
Figure 3:
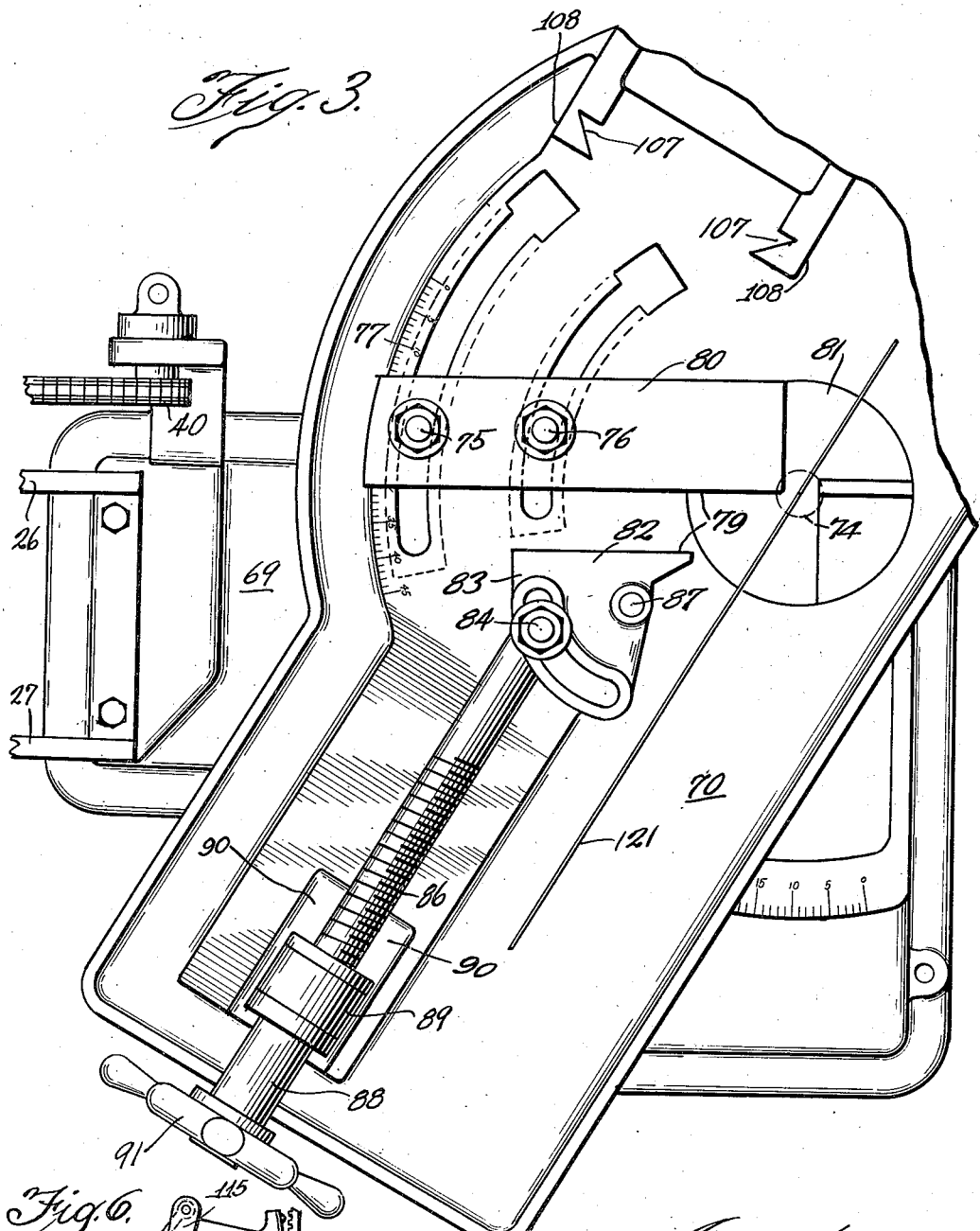
Fig. 3 is a fragmentary plan of the saw frame taken along the line 3—3 of Fig. 1 looking in the direction of the arrows.

In my improved saw machine, a feeding table carrying a feeding truck supported on the rails 26 and 27 (see Fig. 3) serves to move the stock toward the saw in any suitable or well known manner. The saw itself comprises a base frame or casting 69 and carries rotatably mounted thereon the saw frame and control mechanism mounted upon a base 70. The saw frame base 70 is pivoted about a bearing 74 (Fig. 2). The base 70 is adjustably held in position by clamping bolts 78. (Fig. 1). Graduations 77 are provided for determining the position of the saw frame base 70 (Fig. 3).

Figure 6:
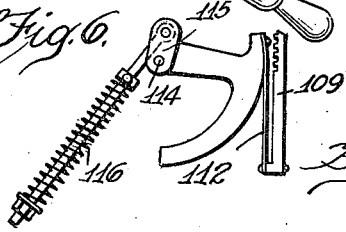
Fig. 6 is a fragmentary view of the part of the saw frame raising mechanism.

A vise 79 for clamping the stock while the saw is operating is mounted upon the saw base 70 and comprises an adjustably fixed jaw 80 rotatable about a pivot 81 and clamped by bolts 75 and 76. A movable jaw 82 comprises a channel shaped clamping portion 83 pivotally held by a clamping nut 84 and a pivot pin 87 to a connecting member 85 to which an operating screw bolt 86 is suitably secured. The operating screw bolt 86 passes through a threaded collar 88 (Fig. 1) suitably held in a bearing 89 mounted upon a movable support 90. A hand wheel 91 is suitably splined to the collar 88. The support 90 is movable in the frame 70 so as to provide for some slight longitudinal movement on the operating screw 86. A lever 92 is pivoted about a bearing 93 mounted on a support 97 secured to the saw frame 70. The lever 92 has an annular shaped ball-like extension 92a penetrating an opening 98 in the frame 70 and contacting a recess 99 in the support 90. The lever 92 is held in a downward position by means of a compression spring 100 suitably mounted in an adjustable container 101 attached to the lever 92 and seated at a point 102 in the saw frame 70. The outer end of the lever 92 cooperates with a cam 103 pivoted at 104 and operated by an operating rod 105. The saw frame 106 is mounted for vertical reciprocation upon the base 70 in channels 107 formed in upright extensions 108 of the saw frame base 70. The saw frame has secured thereto a rack 109 meshing with a spur gear 110 splined to a shaft 111 (Fig. 1). The lower end of the rack 109 has a steel band 112 suitably secured thereto, the other end of which is attached to an arcuate member 113 pivotally mounted at 114 (Fig. 6). The arcuate member has an extension 115 to which is secured an adjustable compression spring 116, the other end of which is mounted on the saw frame 70. The compression spring 116 serves to counterbalance the weight of the saw frame so that it may be moved easily by the rack 109 and the pinion 110, which functions to raise and lower the saw frame so as to bring the saw into contact with the work. The saw frame 106 provides a suitable sliding mounting for the inner hack saw frame whereby horizontal movement is imparted to the hack saw when it is brought into contact with the work.

The saw frame 106 has a toothed ratchet bar 132 suitably secured thereto and adapted to cooperate with a ratchet arm 133 pivoted at 134 upon a bracket 135 secured to the saw base frame 70. The other end of the ratchet lever 133 is pivotally secured to a connecting rod 136, which in turn is secured to the operating lever 50 by a swivel connection 138. The operating lever 50 is adapted to cooperate with any desired adjustable stop operated by the stock feeding mechanism.

The saw itself may be driven in any suitable or well known manner such as shown in my copending application heretofore referred to.

Instead of the locking lever 133 contacting the ratchet 132 to lock the saw frame 106 in raised position, I may employ a hydraulic locking means which comprises a cylinder 250 suitably secured to the saw frame base 69, and having a piston 251 secured through a link 252 to the saw frame 106. Valve mechanism 253 may be connected to the control lever 136 as well as to the shaft 104 through an operating lever 254. Valve mechanism 253 controls the flow of oil or other fluid through the by-pass tube 255 connecting the upper portion of the cylinder 250 to the lower portion. By this means the saw frame may be locked against downward movement hydraulically. It will be noted that valve mechanism 256 in the bottom of the plunger 251 permits upward movement of the saw frame 106, but prevents its downward movement.

It will be noted that the saw frame 106 may be adjusted on the swinging frame 70 so as to provide for any angle of cut of the stock delivered to it, and that the operation of the saw will occur in identically the same manner irrespective of the position of the saw from the downward power drive through the gear 110 and rack 109, and through the sprocket chain 149, which may bring about horizontal movement of the inner saw frame carrying the saw blade.

My invention may be variously modified without departing from the spirit and scope thereof as indicated in the appended claims.

I claim:

1. In a sawing machine, the combination of a stationary base, a saw frame work table pivotally mounted for circular horizontal movement on said stationary base, an arcuate scale on said base co-operating with an indicator on said work table to indicate the rotated position thereof, clamp means for fastening said work table to said base in a desired rotated position, clamp means on said work table for holding stock to be worked upon, an arcuate scale associated with said clamp means whereby stock to be cut may be clamped at the same angle as the work table, a saw frame vertically reciprocal mounted in slideways in said work table, a power operated horizontally reciprocal saw mounted in said saw frame, said saw aligned with and in the same vertical plane as the pivot of said work table.

2. In a sawing machine, the combination of a stationary base, a saw frame work table pivotally mounted for circular horizontal movement on said stationary base, an arcuate scale on said base co-operating with an indicator on said work table to indicate the rotated position thereof, clamp means for fastening said work table to said base in a desired rotated position, clamp means on said work table for holding stock to be worked upon, an arcuate scale associated with said clamp means whereby stock to be cut may be clamped at the same angle as the work table, a saw frame vertically reciprocal mounted in slideways in said work table, a power operated horizontally reciprocal saw mounted in said saw frame, said saw aligned with and in the same vertical plane as the pivot of said work table and automatic means for raising and lowering said power operated saw after and during a sawing operation.

3. In a sawing machine, the combination of a stationary base, a saw frame work table pivotally mounted for circular horizontal movement on said stationary base, an arcuate scale on said base co-operating with an indicator of said work table to indicate the rotated position thereof, clamp means for fastening said work table to said base in a desired rotated position, clamp means on said work table for holding stock to be worked upon, said clamp means having a jaw pivoted in said work table axially above the work table pivot and a movable jaw adapted to be moved to a releasing position after each sawing operation, an arcuate scale associated with said clamp means whereby stock to be cut may be clamped at the same angle as the work table, a saw frame vertically reciprocal mounted in slideways in said work table, a power operated horizontally reciprocal saw mounted in said saw frame, said saw aligned with and in the same vertical plane as the pivot of said work table.

4. In a sawing machine, the combination of a stationary base, a saw frame work table pivotally mounted for circular horizontal movement on said stationary base, an arcuate scale on said base co-operating with an indicator on said work table to indicate the rotated position thereof, clamp means for fastening said work table to said base in a desired rotated position, automatically opening and closing clamp means on said work table for holding stock to be worked upon, an arcuate scale associated with said clamp means whereby stock to be cut may be clamped at the same angle as the work table, a saw frame vertically reciprocal mounted in slideways in said work table, a power operated horizontally reciprocal saw mounted in said saw frame, said saw aligned with and in the same vertical plane as the pivot of said work table.

5. In a sawing machine, the combination of a stationary base, a saw frame work table pivotally mounted for circular horizontal movement on said stationary base, an arcuate scale on said base co-operating with an indicator on said work table to indicate the rotated position thereof, clamp means for fastening said work table to said base in a desired rotated position, automatically opening and closing clamp means on said work table for holding stock to be worked upon, an arcuate scale associated with said clamp means whereby stock to be cut may be clamped at the same angle as the work table, a saw frame vertically reciprocal mounted in slideways in said work table, a power operated horizontally reciprocal saw mounted in said saw frame, said saw aligned with and in the same vertical plane as the pivot of said work table, said clamp means including a pivotally mounted jaw, a movable jaw and means connected between said movable jaw and said saw frame for operating said jaw to a work releasing position when a sawing operation is finished.

6. In a sawing machine, the combination of a stationary base, an upright pivot thereon, a saw frame work table mounted on said pivot for circular horizontal movement on said stationary base, an arcuate scale on said base co-operating with an indicator on said work table to indicate the rotated position thereof, clamp means for fastening said work table to said base in a desired rotated position, clamp means on said work table for holding stock to be worked upon, an arcuate scale associated with said clamp means whereby stock to be cut may be clamped at the same angle as the work table, a saw frame vertically reciprocal mounted in slideways in said work table, means for moving said frame down as the saw progresses, a power operated horizontally reciprocal saw mounted in said saw frame, said saw aligned with and in the same vertical plane as the pivot of said work table.

7. In a sawing machine, the combination of a stationary base, an upright pivot thereon, a saw frame work table mounted on said pivot for circular horizontal movement on said stationary base, an arcuate scale on said base co-operating with an indicator on said work table to indicate the rotated position thereof, clamp means for fastening said work table to said base in a desired rotated position, clamp means on said work table for holding stock to be worked upon, an arcuate scale associated with said clamp means whereby stock to be cut may be clamped at the same angle as the work table, a saw frame vertically reciprocal mounted in slideways in said work table, means for moving said frame down as the saw progresses, a power operated horizontally reciprocal saw mounted in said saw frame, said saw aligned with and in the same vertical plane as the pivot of said work table, and automatic means associated with said saw frame for releasing said clamp means.

8. In a sawing machine, the combination of a stationary base, a saw frame work table pivotally mounted for circular horizontal movement on said stationary base, an arcuate scale on said base co-operating with an indicator on said work table to indicate the rotated position thereof, clamp means for fastening said work table to said base in a desired rotated position, clamp means on said work table for holding stock to be worked upon, an arcuate scale associated with said clamp means whereby stock to be cut may be clamped at the same angle as the work table, a saw frame vertically reciprocal mounted in slideways in said work table, a power operated horizontally reciprocal saw mounted in said saw frame, said saw aligned with and in the same vertical plane as the pivot of said work table, power means for raising and lowering said saw frame and hydraulically operated means for locking said saw frame in a raised position.

9. In a sawing machine, the combination of a stationary base, a saw frame work table pivotally mounted for circular horizontal movement on said stationary base, an arcuate scale on said base co-operating with an indicator on said work table to indicate the rotated position thereof, clamp means for fastening said work table to said base in a desired rotated position, clamp means on said work table for holding stock to be worked upon, an arcuate scale associated with said clamp means whereby stock to be cut may be clamped at the same angle as the work table, a saw frame vertical reciprocal mounted in slideways in said work table, a power operated horizontally reciprocal saw mounted in said saw frame, said saw aligned with and in the same vertical plane as the pivot of said work table, power means for raising and lowering said saw frame and hydraulically operated means for locking said saw frame in a raised position, said hydraulic means including an oil cylinder secured to said work table, a piston connected to said saw frame and a valve operable by the work feeding mechanism for permitting downward movement of said piston.

10. In a sawing machine, the combination of a stationary base, an upright pivot thereon, a saw frame work table mounted on said pivot for circular horizontal movement on said stationary base, clamp means for fastening said work table to said base in a desired rotated position, clamp means on said work table for holding stock to be worked upon, a saw frame vertically reciprocal mounted in slideways in said work table, means for moving said frame down as the saw progresses, a power operated horizontally reciprocal saw mounted in said saw frame, said saw aligned with and in the same vertical plane as the pivot of said work table, and automatic means associated with said saw frame for releasing said clamp means.

11. In a sawing machine, the combination of a stationary base, a saw frame work table pivotally mounted for circular horizontal movement on said stationary base, an arcuate scale on said base co-operating with an indicator on said work table to indicate the rotated position thereof, clamp means for fastening said work table to said base in a desired rotated position, clamp means on said work table for holding stock to be worked upon, said clamp means angularly movable with respect to said work table, an arcuate scale associated with said clamp means whereby stock to be cut may be clamped at the same angle as the work table, a saw frame vertically reciprocal mounted in slideways in said work table, a power operated horizontally reciprocal saw mounted in said saw frame, said saw aligned with and in the same vertical plane as the pivot of said work table, power means for raising and lowering said saw frame and hydraulically operated means for locking said saw frame in a raised position.

CHARLES RASMUSSEN.